United States Patent [19]

Nelson

[11] 4,313,502

[45] Feb. 2, 1982

[54] ROCK EXTRACTOR APPARATUS AND METHOD

[76] Inventor: Daniel L. Nelson, Rte. 1, South, Box 175, Seminole, Tex. 79360

[21] Appl. No.: 115,059

[22] Filed: Jan. 24, 1980

[51] Int. Cl.$^3$ .............................................. A01B 43/00
[52] U.S. Cl. .................................... 171/63; 171/120; 172/32; 172/33
[58] Field of Search ................. 171/63, 64, 1, 83, 120, 171/136; 172/32, 33; 56/10.2; 37/8

[56] References Cited

U.S. PATENT DOCUMENTS

| | | | |
|---|---|---|---|
| 192,712 | 7/1869 | Farmer | 171/20 |
| 394,682 | 12/1888 | Edwards | 171/20 |
| 512,287 | 1/1894 | Gird | 171/20 |
| 667,890 | 2/1901 | Moulton | 171/20 |
| 1,331,957 | 2/1920 | Devey | 171/20 |
| 1,474,492 | 11/1923 | Pierson | 414/732 |
| 1,478,142 | 12/1923 | Ortmann | 171/120 |
| 2,060,688 | 11/1936 | Pryor et al. | 172/33 |
| 2,582,872 | 1/1952 | Krenyel | 171/120 |
| 2,984,022 | 5/1961 | Johnson | 171/120 |

*Primary Examiner*—Jay N. Eskovitz
*Attorney, Agent, or Firm*—Sherman & Shalloway

[57] ABSTRACT

The present invention relates to a rock extractor apparatus and method of using the rock extractor for removing rocks embedded in the ground and/or for removing rocks partially embedded in the ground. The invention is particularly directed to removing rocks from soil suitable for farming. The rock extractor consists essentially of a digger unit, a grate unit and a conveyor unit, all of which cooperate to efficiently and effectively extract rocks from the soil and to render the soil suitable for cultivation. The rock extractor is attached to a draft machine such as a tractor and pulled through the soil.

The tractor pulling the extractor through the soil causes rock and soil to be dug up and moved over the digger unit. The grate unit and conveyor unit cooperate to forcefully drive the conveyor unit downwardly and forwardly into the pile of rock and soil that is moved from the digger unit onto the grate unit and to rapidly move the rock and soil rearwardly along the grate unit. The conveyor unit is operably connected to the grate unit by parallel connecting lever arms which allow the conveyor unit to move vertically upwardly relative to the grate unit to accommodate the handling of large rocks and/or other obstructions. The extracted rock can be dropped onto a second conveyor, lifted and collected in a hopper and subsequently dumped onto a truck for removal from the area.

28 Claims, 7 Drawing Figures

ROCK EXTRACTOR APPARATUS AND METHOD

BACKGROUND OF THE INVENTION

Throughout the United States and any many parts of the world there are many areas of land which contain fertile, cultivatible soil which, however, it has been uneconomical to cultivate and farm because the land contains embedded therein rocks of various sizes and/or contains rocks partially embedded in the surface of the land. These lands having embedded or partially embedded therein numerous rocks heretofore have been unsuitable for farming or cultivation because of the presence of the rocks causing damage and/or breaking the conventionally used plowing and/or tilling machinery.

The manual digging and removal of rocks and the lifting of the rocks onto trucks or other conveyances have been uneconomical and even with unskilled labor it has been cost prohibitive to clear the land. In addition, this type of work is back breaking and even among unskilled laborers few are willing or able to do the work.

Though there is commercially available machinery and equipment that will pick up small and medium size rocks from the surface of the ground, there has not been any equipment available that would dig up rocks from below the surface of the ground and/or rocks partially embedded in the ground and remove them to other areas. There is also machinery available that will dig into the ground to cut deeply rooted weeds which machinery inherently lifts rocks embedded in the ground or partially embedded in the ground. This machinery, however, merely turns the ground over and dumps the soil and rock back onto the ground to again partially embed the rocks in the ground.

There therefore exists and has existed for some time a serious need for machinery and equipment that could economically and effectively remove rocks from soil to a depth sufficient to allow farming and cultivation of the soil using modern farm machinery and equipment. The development of such machinery and equipment would readily bring into production large areas of otherwise unusable fertile and cultivatible land to produce food for a hungry and needy world.

OBJECTS OF THE INVENTION

It is an object of the present invention to provide a rock extractor apparatus for removing rocks from land to a depth suitable for cultivation with conventional machinery and equipment.

It is another object of the present invention to return the soil to the land in a condition ready for planting without further treatment.

It is another object of the present invention to provide rock extractor apparatus that simply and efficiently dig and remove rocks to clear soil of rocks to a desired depth, and lift the rocks to a level such that the rocks can conveniently be removed from the area by conventional means.

It is another object of the present invention to provide a rock extractor apparatus consisting essentially of a digger unit, a grate unit and a conveyor unit which, through its operation, causes the conveyor unit to forcefully move downwardly and forwardly into the soil and rock being worked.

It is another object of the present invention to provide a rock extractor comprising a digger unit to dig and remove rock to a prescribed depth in the ground, a grate unit for screening and sifting the rock from the soil and a conveyor unit for moving the rock and soil rearwardly along the grate.

It is another object of the present invention to provide a rock extractor unit comprising a digger unit, a grate unit and a conveyor unit which cooperate and allow the conveyor unit to rise and clear any large rocks or the like which may be dug up by the digger unit while at the same time having the conveyor unit maintain a maximum downward and forward movement of the conveyor into the pile of rock and soil being worked to thereby increase the effectiveness and speed of the removal of rock from the ground.

It is another object of the present invention to provide a parallel lever arms means of mounting the conveyor unit to the grate unit which results in greater rock removing capacity and soil moving capacity for the conveyor.

It is another object of the present invention to provide a conveyor unit which by its coaction with the digger and grate units readily separates rocks from soil, sifts the soil from the rocks and readily move the separated rocks rearwardly along the grate to collect the rocks and remove them from the area.

It is another object of the present invention to provide an improved mounting for a load-facilitating conveyor of a scraper which not only will permit the lower end of the conveyor to rise freely to clear any rocks or the like which might be scraped up by the scraper blade, but also will enable the conveyor to move a greater quantity of dirt rearwardly to thereby increase the effectiveness of the earth-cutting and scraping-up action of the scraper blade.

Other objects and advantages of the invention will become apparent from the following description and accompanied drawings.

BRIEF DESCRIPTION OF THE INVENTION

The present invention is particularly directed to an improved rock extractor apparatus and method of using the apparatus for extracting rocks to a prescribed depth from soil, screening the rocks from the soil, sifting the soil, returning the soil to the ground and transporting the rock to another location. The rock extractor apparatus comprises in combination a digger unit 1, a grate unit 2 and a conveyor unit 3 which cooperate to efficiently and effectively remove the rock from the soil. The grate unit 2 has attached thereto a collecting apron 4.

The rock extractor is attached to a suitable draft machine or equipment for pulling the rock extractor apparatus. The rock extractor apparatus can have attached to it a conventional means for collecting the rock and removing the rock from the area.

The digger unit 1 consists of two parallel vertical beam members 5 which are rigidly connected at the lower end thereof by blade 6 and rigidly connected at an upper portion thereof by cross-bracing beam 7. The bottom portion of the vertical beam members 5 contain a transverse shaft 10 which connects the digger unit 1 to the grate unit 2. The top portion of the digger unit 1 is connected by support beam 13 to the rear end of grate unit 2. The vertical beam member 5 also contains holes 16 and 17 for connecting the rock extractor to a conventional draft machine or equipment, such as a tractor.

The grate unit 2 comprises side frame members 21, flat parallel bars 23 having holes in the front end thereof joined by transverse shaft 10, and holes in the back end thereof joined by transverse shaft 27. There is evenly spaced between the two side frame members 21 a grating made up of the flat parallel bars 23. There are support beams 13 which are pivotally connected to the rear end of side frame members 21 of grate 2 and to the top portion of the vertical beam member 5. The grate unit 2 frame side members 21 have connected thereto front upstanding beam members 35 and back upstanding beam members 36. The front and back upstanding beam members 35 and 36 are rigidly connected to the side frame members 21.

There are connected to the top portion of each of the beam members 35 and 36 parallel front lever arms 41 and back lever arms 42. The parallel lever arms 41 and 42 extend rearwardly and downwardly and operably connect the grate 2 to the conveyor 3. The front portion of the parallel lever arms 41 are pivotally connected to an upper portion of the front beam member 35. The front portion of the parallel back lever arms 42 are pivotally connected to the upper portion of beam 36. The parallel lever arms 41 and 42 allow the conveyor 3 to move vertically upward relative to the grate 2 while maintaining a parallel relationship between grate 2 and conveyor 3.

The maximum downward movement of the forward parallel lever arms 41 and the back parallel lever arms 42 is determined by stops 45 and 46, respectively.

There is connected to the back end of grate 2 a collecting apron 4. The collecting apron 4 is pivotally connected to the rear end of grate 2 by hinges. The collecting apron has an upstanding beam 53 to which is attached rod 55 which connects the apron 4 to support beam member 13.

There is also carried on support beam 13 hydraulic power line 57 to power the conveyor 2 and hydraulic power line 58 to power the dumper. There is welded to the digger unit 1 a connecting hitch 60 for connecting the rock extractor to a conventional type conveyor unit and dump unit.

The conveyor unit 3 is operably connected to the side frame members 21 of the grate 2 by parallel lever arms 41 and 42. The parallel lever arms 41 and 42 are pivotally connected to the conveyor main frame 61. The frame of the conveyor unit 3 comprises main frame members 61, the transverse frame member 64 and cross frame members 65. The transverse frame member and cross frame members are suitable welded to the main frame members to provide a strong rigid construction.

The front ends of the main frame are joined together by transverse shaft 66 which passes through the main frame and has journaled bearings in side plates 67 and has rotatably mounted thereon front idler wheels 69.

The rear ends of the main frame are joined together by transverse shaft 70 which passes through extension plate members 71 and side plates 72 which have journaled bearings for transverse shaft 70. The transverse shaft 70 has rotatably mounted thereon the drive gears 75. The drive gears 75 are driven by a planetary hydrostatic drive motor 76 mounted proximate to drive gear 75 to drive the gear 75 and chain 74 at the desired rotational speed.

There is disposed slightly forward of a point about midway between the front idler wheels 69 and the drive gear 75 a center idler wheel 77. The main frame has adjustably connected on the inner wall surface at a point between the center idler wheel and the drive gear a tension idler carrier bracket 78 having rotatably mounted on a stub shaft 79 connected thereto tension idler wheel 80.

The endless chain 74 has removably connected thereto a plurality of evenly spaced apart transverse paddles 83. The paddles can be bolted to the chain by bolts 84 passing through end portion 85 of paddles 83 and a mating plate 86 welded to a link of the chain.

This invention also relates to improvements in earth-moving apparatus and, more particularly, in machines of that character in the form of a wheeled container 210 having, at its forward end, a scraper blade 232 adapted to be lowered into engagement with the earth to scrape dirt up into the container 210 on forward movement thereof, for transport to and discharge at another location.

The many advantages that accrue to the described novel rock extractor apparatus for clearing large areas of fertile cultivatible land can be readily appreciated.

BRIEF DESCRIPTION OF THE DRAWINGS

FIG. 6 is a longitudinal vertical sectional view of a scraper-type earth-moving machine embodying the present invention.

DETAILED DESCRIPTION OF THE DRAWINGS

The rock extractor apparatus will be described in detail with reference to the accompanying drawings, FIGS. 1 through 5. The rock extractor apparatus comprises in combination a digger unit 1, a grate unit 2 and a conveyor unit 3 which cooperate to efficiently and effectively remove the rock from the ground. The grate unit has operably connected to it a collecting apron 4. In addition, a conventional conveyor type unit 101 and hopper unit 102 may optionally be used with the rock extractor for collecting and dumping the rock on a suitable vehicle for removing the rock from the area. Such a conveyor and hopper unit are shown in FIG. 5. The rock extractor can be attached to a suitable draft machine or equipment for pulling the rock extractor, for example a tractor.

Figure 1:
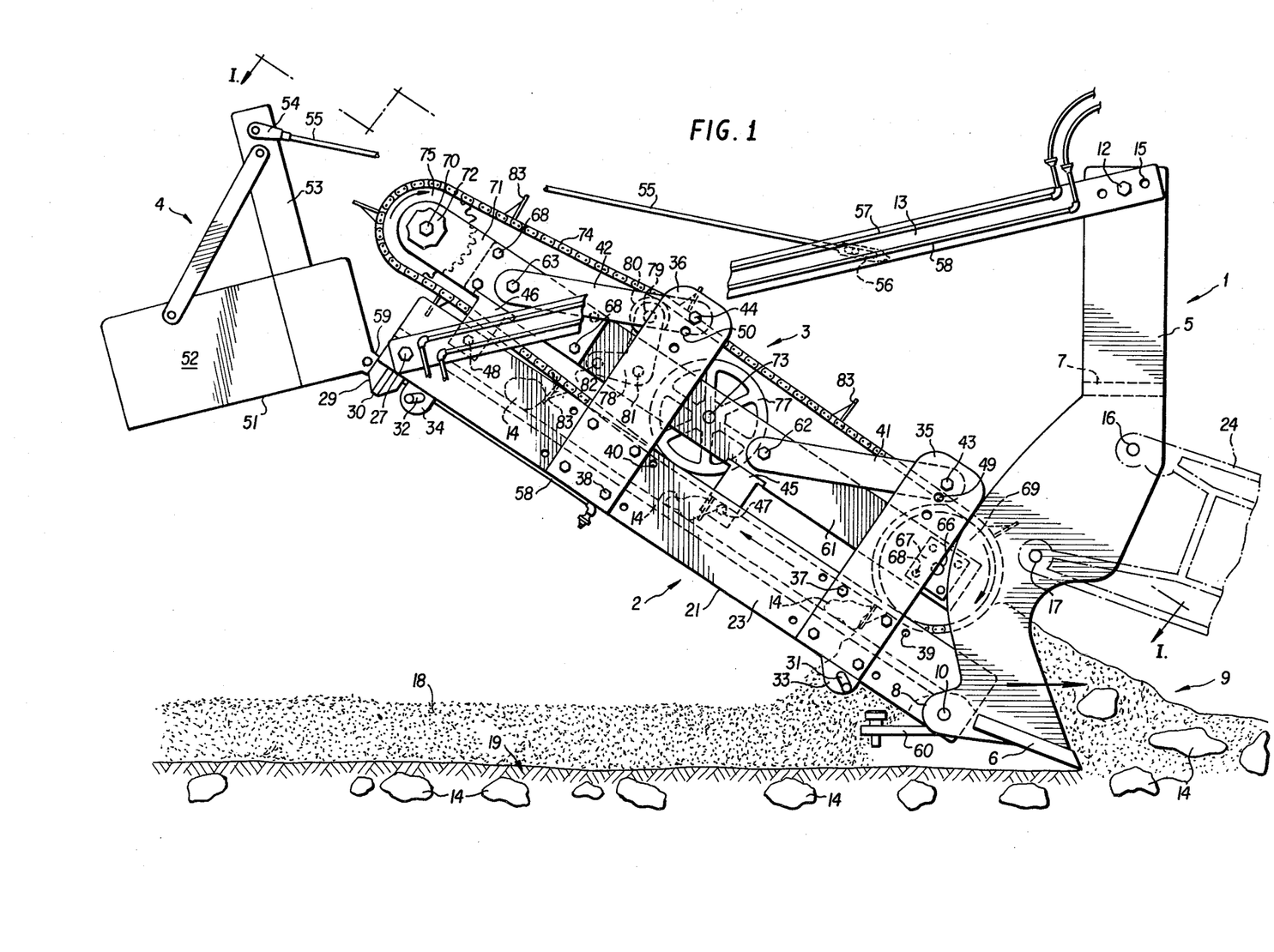
FIG. 1 is a longitudinal, vertical sectional side view of a rock extractor ready for attachment to a tractor, not shown.
Figure 2:
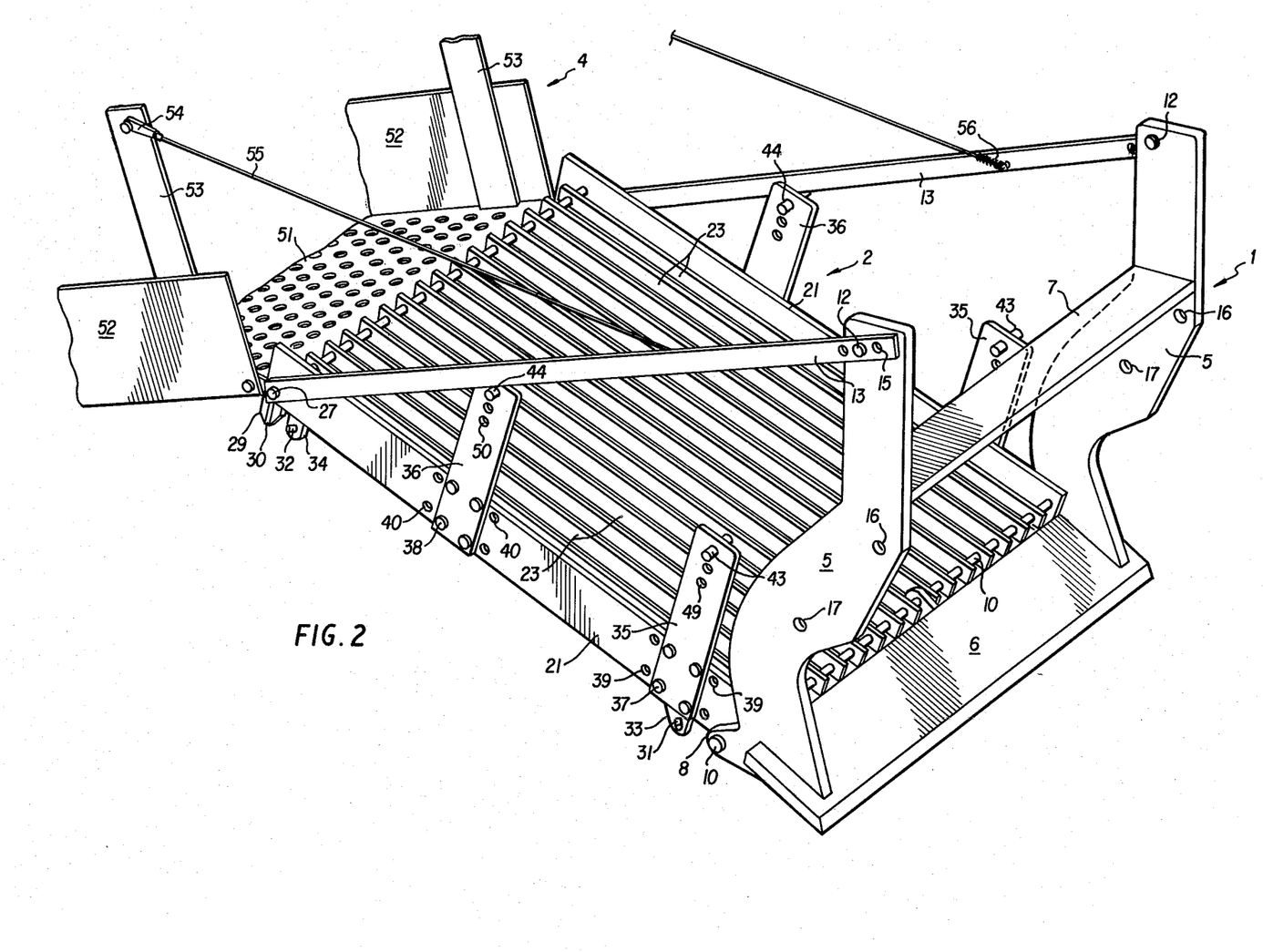
FIG. 2 is a perspective view of the digger unit and grate unit.

The FIGS. 1 and 2 of the drawings are referred to with reference to the digger unit. The digger unit 1 comprises two parallel vertical beam members 5 which are rigidly connected at the lower end by blade 6 and rigidly connected at an upper portion thereof by cross-bracing beam 7. The bottom portion of the vertical beam members 5 contain heels 8 which have holes through which pass a transverse shaft 10 for connecting the digger unit 1 to grate unit 2. The top portion of vertical beam 5 of digger unit 1 contains holes through which pass bolts 12 by which it is pivotally connected through holes in the support beam 13. The support beam 13 connects the digger unit to the back of the grate unit 2. The support beam 13 may have one or more additional holes 15 for adjusting the angle of the grate 2 to the surface of the ground. The vertical beam member 5 also contains holes 16 and 17 to connect the rock extractor to a draw bar 24, shown in outline, and to a draft machine or equipment, such as a tractor, not shown. The draw bar 24 has operably connected thereto a double acting hydraulic cylinder, not shown, for raising the extractor unit above ground level or for setting the depth of blade 6 to the desired level below ground level and holding it at that level during operation of the rock extractor unit.

The FIGS. 1 and 2 of the drawings are also referred to with reference to the grate unit. The grate unit 2 comprises side frame members 21, flat parallel bars 23 having holes in the front end thereof joined by transverse shaft 10, and holes in the back end thereof joined by transverse shaft 27. There is evenly spaced between the two side frame members 21 a grating made up of a plurality of the flat parallel bars 23. The parallel bars 23 have holes in the front end thereof. Front ends of the parallel bars 23 are aligned by transverse shaft 10 which extends through the holes of all of the parallel bars 23, holes in the side frame members 21 and the holes in the heel portion 8 of the vertical member 5 of the digger unit 1. The back ends of the parallel bars 23 contain similar holes and are aligned by transverse shaft 27 which passes through the holes in the parallel bars 23, holes in the back portion of the side frame members 21 and through holes in the back end of the support beams 13. The support beams 13 are pivotally connected to side frame members 21 and vertical beam member 5 and connect the back end of the side frame member 21 of the grate 2 to vertical beam member 5 of the digger unit 1.

There is disposed beneath the side frame 21 a carrier plate 29. The carrier plate 29 is welded to the side frame and is slotted to receive floating support beam 30 for the grating. The floating beam 30 can be held in place by a pin, not shown, that passes through the carrier plate and the floating support beam 30.

The grate frame members 21 are strengthened by cross-support rods 31 and 32 which pass through holes in support plates 33 and 34 welded onto the bottom portion of side frame member 21. The tension on the rods is adjustable by threaded bolts, not shown, such that the grate frame is made rigid.

The grate unit 2 frame side members 21 have connected thereto front upstanding beam members 35 and back upstanding beam members 36. The front upstanding beam members 35 are opposite each other and the back upstanding beam members 36 are opposite each other. The front and back upstanding beam members 35 and 36 are rigidly connected to the side frame members 21 by bolts 37 and 38, respectively, which pass through holes in the upstanding beam members and in the side frame members 21. Additional longitudinally displaced holes 39 and 40 can be provided in the side frame member 21. These holes 39 and 40 allow adjustment such that the entire conveyor unit 3 can, if desired, be moved forward or rearward, respectively, relative to grate 2.

There are connected to the top portion of each of the beam members 35 and 36 parallel front level arms 41 and back lever arms 42. The parallel lever arms 41 and 42 extend rearwardly and downwardly and operably connect the grate 2 to the conveyor 3. The front portion of the parallel lever arms 41 are pivotally connected by pin 43 to an upper portion of the front beam member 35. The front portion of the parallel back lever arms 42 are pivotally connected by pin 44 to the upper portion of beam 36. The parallel lever arms 41 and 42 allow the conveyor 3 to move vertically upward relative to the grate 2 while maintaining a parallel relationship between grate 2 and conveyor 3.

The maximum downward movement of the forward parallel lever arms 41 and the back parallel lever arms 42 is determined by stops 45 and 46, respectively. The stops 45 and 46 are connected to grate 2 side members 21 by bolts 47 and 48, respectively, that pass through the stops and side frame members 21. The front beam member 35 and back beam member 36 have vertically disposed holes 49 and 50, respectively, which allow adjustment of the angle relative to the grate of the parallel lever arms 41 and 42, respectively.

The back portion of grate 2 is pivotally connected to support beam 13 by an extension of shaft 27 which extends through holes in the support beam 13 and holes in the side of frame member 21. The front portion of support beam 13 is pivotally connected to the top of vertical beam member 5 of the digger unit 1 by bolt 12 passing through a hole in the beam member 5. The adjustment of the relative angle of grate 3 to the surface of the ground can be made by providing additional holes 15 in the support beam 13 and movement of the support beam 13 to one or more of the holes 15.

There is connected to the back end of grate 2 a collecting apron 4. The collecting apron 4 is pivotally connected to the rear end of grate 2 by hinges 59. The connecting apron has a floor 51 and side wall members 52 which allow the rock to be moved from the grate 2 to a second conveyor means 101 (FIG. 5). The floor of the apron 4 has a plurality of holes which allow the screening of any dirt adhering to the rock and removal of the dirt prior to the rock being loaded onto the second conveyor. The collecting apron has an upstanding beam 53 to which is attached plate 54 and rod 55 which connects the apron 4 to support beam member 13. The front end of the connecting rod 55 has shock absorbing spring mounting means 56 which is connected to support beam 13.

There is also carried on support beam 13 hydraulic power line 57 to power the conveyor 2 and hydraulic power line 58 to power the dumper. There is welded to the digger unit 1 a connecting hitch 60 for connecting the rock extractor to a conventional type conveyor unit and dump unit for lifting rock to a sufficient height to be dumped onto a truck for removal of the rock from the area.

Figures 3, 3A:
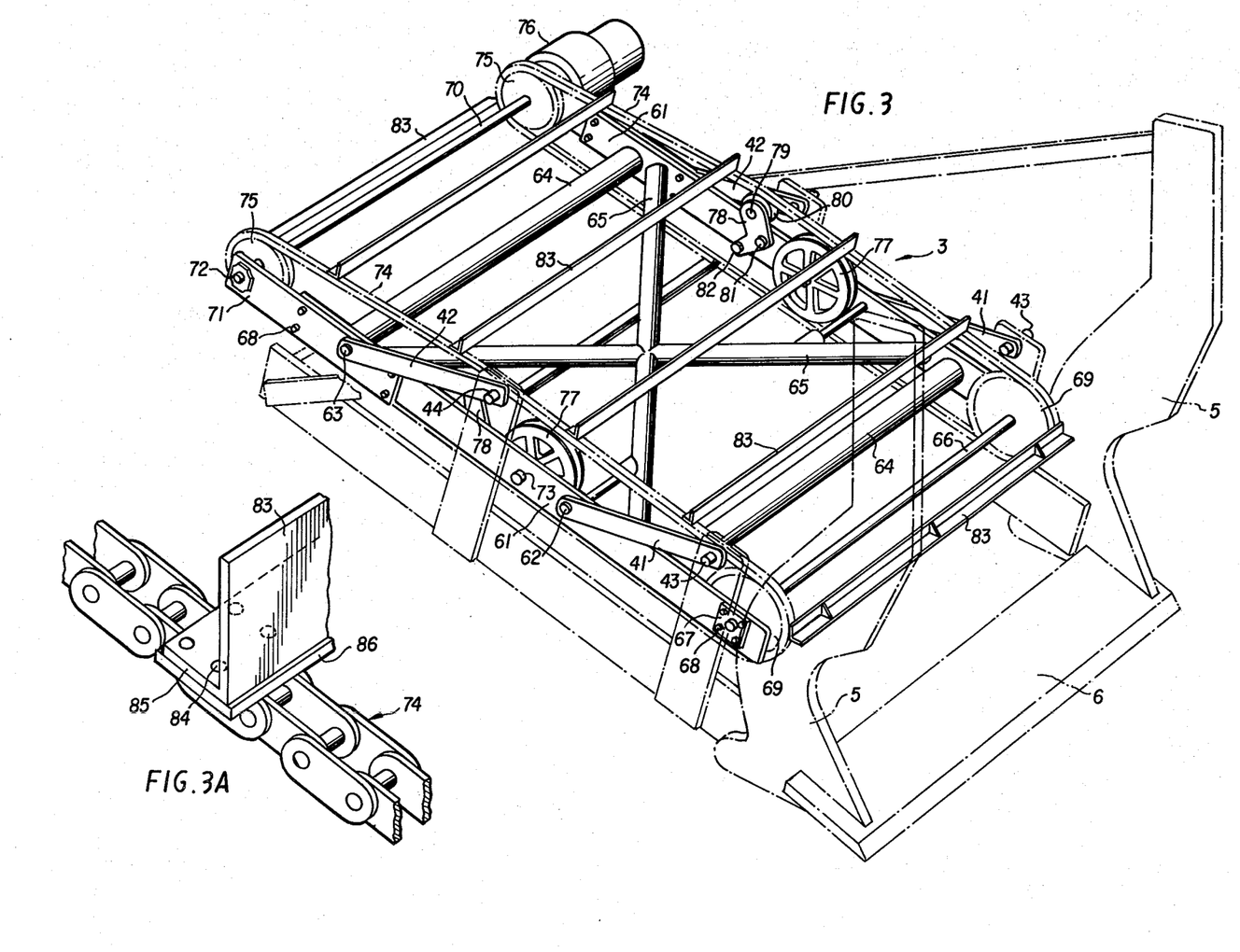
FIG. 3 is a perspective view of the conveyor unit with the digger unit and grate unit shown in outline.
FIG. 3a is an enlarged detailed view showing the construction of the chain links and the means of attaching the conveyor paddles to the endless chain.

The FIGS. 1, 3 and 3a are referred to with reference to the conveyor unit. The conveyor unit is disposed proximate to, above and behind the leading edge of the blade means and extends upwardly and rearwardly from said blade means, i.e. from the blade 6 of digger unit 1. The conveyor unit 3 is operably connected to the side frame member 21 of the grate 2 by parallel lever arms 41 and 42. The parallel lever arms 41 and 42 are pivotally connected to the conveyor main frame 61 by stub shafts 62 and 63, respectively, which are rigidly connected to the frame 61 and which pass through holes in the lever arms 41 and 42.

The frame of the conveyor unit 3 comprises main frame members 61, the transverse frame member 64 and cross frame members 65. The transverse frame member and cross frame members are suitably welded to the main frame members to provide a strong rigid construction.

The front ends of the main frame are joined together by transverse shaft 66 which passes through the main frame and has journaled bearings in side plates 67. The side plates 67 are attached to the main frame by bolts 68, such that the plate containing the bearings may be removed and replaced. The transverse shaft 66 has rotatably mounted therewith front idler wheels 69.

The rear ends of the main frame are joined together by transverse shaft 70 which passes through extension plate members 71 and side plates 72 which have journaled bearings for transverse shaft 70. Side plates 72 and the journaled bearings contained therein are removably connected to extension plate members 71 such that they can be removed and the bearings replaced.

The extension plate members 72 form the back portion of the main frame 61 and are removably connected to the main frame by bolts 68 to allow putting on and removal of the endless chain 74. The transverse shaft 70 has rotatably mounted therewith the drive gears 75. The drive gears 75 are driven by a planetary hydrostatic drive motor 76 mounted proximate to drive gear 75 to drive transverse shaft 70, drive gear 75 and chain 74 at the desired rotational speed. The hydraulic fluid is supplied to the motor 76 by hydraulic supply line 57 (FIG. 1).

There is disposed slightly forward of a point about midway between the front idler wheels 69 and the drive gear 75 a center idler wheel 77. The center idler wheel 77 is rotatably mounted on stub shaft 73 which is fixedly attached to the inner wall side of the main frame 61. The center idler serves to hold the endless chain 74 downwardly in a direction towards grate unit 2.

The main frame has adjustably connected on the inner wall surface at a point between the center idler wheel and the drive gear a tension idler carrier bracket 78 having rotatably mounted on a stub shaft 79 connected thereto tension idler wheel 80. The carrier bracket 78 is pivotally connected to the main frame by bolt 81. The positioning of the carrier bracket is by a bolt 82 which passes through a hole in the carrier plate and one or more hole positions, not shown, in the main frame, such that the carrier plate 78 and the tension idler wheel 80 positions may be adjusted in accordance with the tension desired on the endless chain 74.

The endless chain 74 has removably connected thereto a plurality of evenly spaced apart transverse paddles 83. The paddles can be bolted to the chain by bolts 84 (FIG. 3a) passing through end portion 85 of paddles 83 and a mating plate 86 welded to a link of the chain. The respective plates and bolts are positioned so as not to interfer with the movement of the endless chain around the drive gear and idler wheels.

Figure 4:
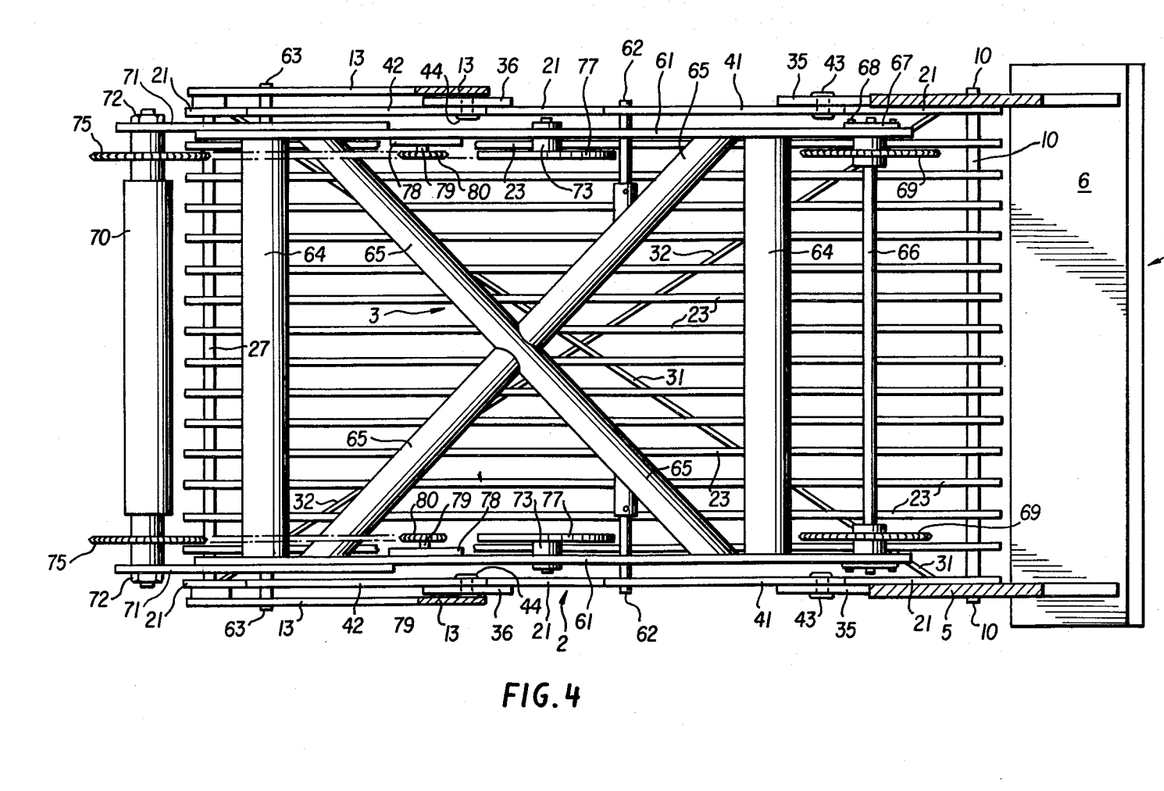
FIG. 4 is a top view of the rock extractor taken through line I—I of FIG. 1 of the drawings showing the digger unit, the conveyor unit and beneath the conveyor unit portions of the grate unit.
Figure 5:
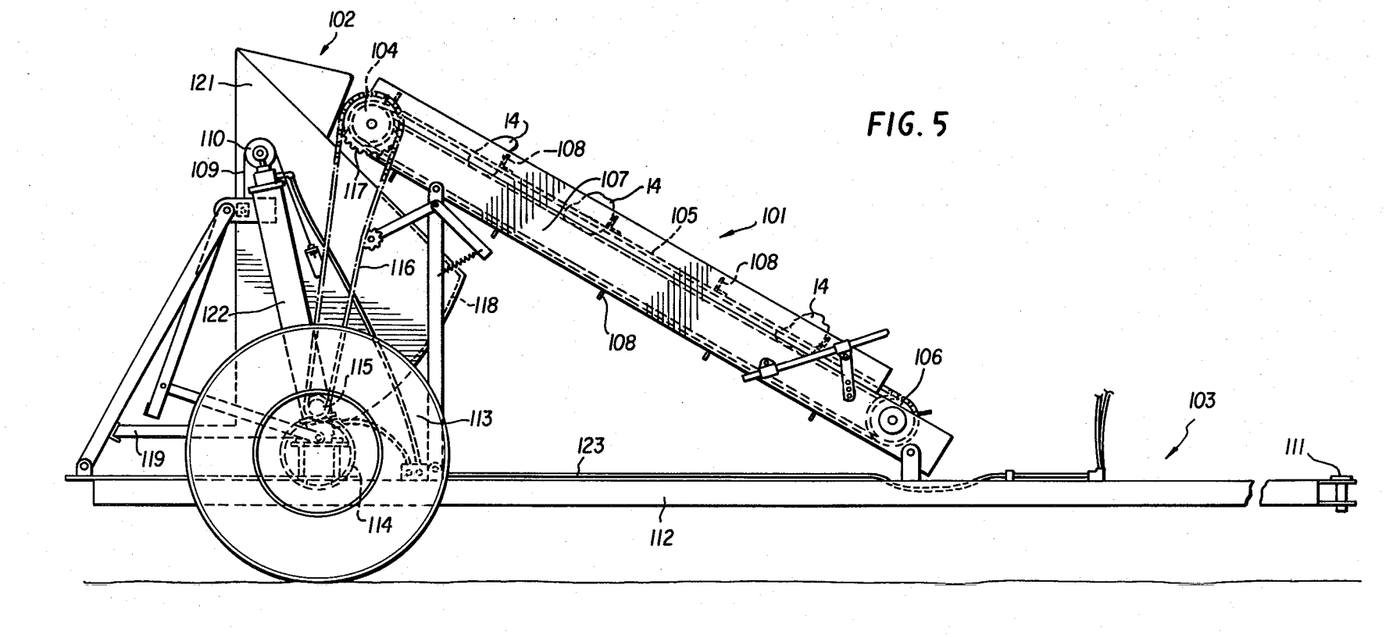
FIG. 5 is a longitudinal, vertical section of a conventional type conveyor unit and hopper mounted on a frame suitable for attaching to the rock extractor apparatus.

The FIG. 4 is a top view of the rock extractor taken through lines I—I of FIG. 1 of the drawings showing the digger unit 1, the conveyor unit 3 and beneath the conveyor unit portions of the grate unit 2. Illustrated in the drawings are the two parallel vertical beam members 5 of digger unit 1 which are rigidly connected at the lower end thereto by blade 6 and rigidly connected to an upper portion thereof by cross-bracing beam 7, not shown. The transverse shaft 10 passes through the bottom potion of the vertical beam members 5 and connects the two vertical beam members 5. Only the back portion of the support beam member 13 which connects the digger unit to the back of the grate unit 2 is shown in this drawing.

The conveyor unit 3 is shown operably connected to the side frame member 21 of grate 2 by parallel lever arms 41 and 42 and upstanding beam members 35 and 36, respectively. The parallel lever arms 41 and 42 are pivotally connected to the conveyor main frame 61 by stub shafts 62 and 63, respectively. The frame of the conveyor unit 3 comprises main frame members 61, the transverse frame member 64 and cross frame members 65. The front ends of the main frame are joined together by transverse shaft 66 which passes through the main frame and has journaled bearings in side plates 67, which are attached to the main frame by bolts 68. Transverse shaft 66 has rotatably mounted thereon front idler wheels 69. The rear ends of the main frame are joined together by transverse shaft 70 which passes through extension plate members 71 and side plates 72 which have journaled bearings for transverse shaft 70. The extension plate members 71 formed the back portion of the main frame 61 and are removably connected to the main frame by bolts 68. The transverse shaft 70 has rotatably mounted therewith the drive gear 75. The transverse shaft 70 and drive gears 75 are driven by planetary hydrostatic drive motor 76 (FIG. 3) mounted proximate to drive gear 75 to drive the gear 75 and chain 74 at the desired rotational speed.

There is disposed slightly forward of a point about midway between the front idler wheel 69 and the drive gear 75 a center idler wheel 77. The center idler wheel 77 is rotatably mounted on stub shaft 73 which is fixedly attached to the inner side wall of the main frame 61. The main frame has adjustably connected on the inner wall surface at a point between the center idler wheel and the drive gear a tension idler carrier bracket 78 having rotatably mounted on a stub shaft 79 connected thereto tension idler wheel 80. The carrier bracket 78 is pivotally connected to the main frame by bolt 81 (FIG. 3).

The endless chain 74 has removably connected thereto a plurality of evenly spaced transverse paddles 83 (FIG. 3).

Immediately beneath the conveyor unit 3 and cooperately connected to the conveyor unit 3 is the grate unit 2. The grate unit 2 comprises side frame members 21, flat parallel bars 23 having holes in the front end thereof joined by transverse shaft 10, and holes in the back end thereof joined by transverse shaft 27. There is evenly spaced between the two side frame members 21 a grating made up of a plurality of the flat parallel bars 23. The support beam 13 is pivotally connected to side frame members 21 and vertical beam members 5, however, only the back portion of the support beam members 13 are shown in this drawing.

The grate frame members 21 are strengthened by cross-support rods 31 and 32 which pass through holes in support plates 33 and 34 (FIG. 3) welded onto the bottom portion of the side frame members 21. The grate unit 2 frame side members 21 have rigidly connected thereto front upstanding beam members 35 and back upstanding beam members 36. There are connected to the top portion of each of the beam members 35 and 36 parallel front lever arms 41 and back lever arms 42. The parallel lever arms 41 and 42 extend rearwardly and downwardly and operably connect the grate 2 to the conveyor 3. The front portion of the parallel lever arms 41 are pivotally connected by pin 43 to an upper portion of the front beam member 35. The front portion of the parallel back lever arms 42 are pivotally connected by pin 44 to the upper portion of beam 36. The parallel lever arms 41 and 42 allow the conveyor 3 to move vertically upward relative to the grate 2 while maintaining a parallel relationship between grate 2 and conveyor 3.

The FIG. 5 of the drawings show conventional type conveyor and hopper units which may be optionally used in combination with the rock extractor apparatus of the present invention. The conveyor unit 101 is mounted on a chassis 103 and operates in combination with hopper unit 102. The conveyor unit 101 comprises a drive gear 104 for endless chain 105 containing a plurality of evenly spaced paddles 108 for lifting rocks 14 upwardly and rearwardly into hopper 102. The endless chain 105 passes around drive gear 104 and idler wheel 106. The drive gear 104 is driven by endless chain 116 and driven gear 117. The chassis 103 has connecting hitch 111 for connecting the chassis to the rock extractor apparatus. The chassis is formed by tubular frame members 112 and carrier wheels 113. The wheels 113 contain toothed drive gear 114 which rotates in the same direction as the wheel when the chassis is drawn forward. The toothed gear 114 drives following gear 115 which drives endless chain 116. The endless chain 116, as mentioned above, drives driven gear 117 which drives drive gear 104 which operates the conveyor unit endless chain 105.

The rocks 14 as they are moved upward and rearwardly are dropped into hopper 121. When the hopper 121 becomes full of rocks, the hopper is dumped by activation by hydraulic cylinder 122 which is powered by hydraulic line 123 from the draft machine or equipment, e.g. a tractor. The hydraulic line 123 is attached to hydraulic power line 57 which is located on the rock extractor apparatus.

The FIG. 6 of the drawings is referred to with reference to an open front earth moving container equipment embodiment of the present invention. The figure of the drawings shows an open-top and open-front earth-moving container 210 having side walls 212 and a rear wall 214. The bottom of the container is formed by two dumping doors 216 and 218, each mounted for swinging movement about a horizontal axis by bolts 220 that pivotally connect upstanding ears 219 at the sides of each door with the container side walls 212. Links 222 on opposite sides of the container 210 connect the two doors 216 and 218 together for simultaneous swinging movement. The doors 216 and 218 may be moved between their open and closed positions, and retained in the latter, by double-acting hydraulic cylinders 224, one on each side of the container 210 and each pivotally connected at one end to the corresponding side wall 212 and at the other end to the corresponding link 222. The container 210 preferably is re-enforced by an exterior frame that has side portions 226 which extend rearwardly of the rear wall 214 and are supported on the opposite ends of an axle 228 on which are journalled ground-engaging wheels 230.

At its forward and lower end, immediately in advance of the front dumping door 216, the container 210 is provided with a downwardly and forwardly inclined fixed scraper blade 232 which extends between the side walls 212. Obviously, when the forward end of the container 210 is moved downwardly so that the scraper blade 232 engages the earth, forward movement of the container scrapes up dirt by the blade.

The two arms 234 of a fork-like or wishbone-shaped member 236 straddle the container 210 at its forward end, and have their free ends pivotally secured to the outer sides of the container, as at 238, at positions disposed rearwardly of the blade 232. The stem 240 of the member 236 is in the shape of a gooseneck having a fifth wheel arrangement, generally indicated at 242, mounting a transverse axle 244 which carries a pair of ground-engaging wheels 246. Connected to the axle 244 is a draw bar 248, generally indicated in dotted lines, that may be connected to an appropriate prime mover (not shown), such as a tractor, for towing the earth moving machine. Two-way hydraulic cylinders 250, one at each side of the container 210, are connected between the transverse arm-connecting postion 252 of the member 236 and the lower forward portion of the outer sides of the container in advance of the pivotal connection of the arms 234 with the container. When the cylinders 250 are retracted, as shown in FIG. 6, the scraper blade 232 is held up out of engagement with the earth so that the apparatus may be towed freely along the ground. Extensions of the cylinders 250, however, serves to move the forward end of the container 210 down so that the scraper blade 232 will penetrate into the earth to a predetermined depth. In this position, forward movement of the apparatus causes the scraper blade 232 to dig into and scrape up dirt.

Disposed within the open front of the container 210 is an upwardly and rearwardly inclined endless conveyor 3 and grate 2 of the type illustrated in FIGS. 1 to 4 which conveyor 3 and grate 2 have already been discussed above in detail, and the method of operation of which is discussed below.

METHOD OF OPERATION

The method of operation of the rock extractor apparatus is described with reference to FIG. 1 of the drawings. The action of the double hydraulic cylinder attached to draw bar 24 (shown in outline) moves the digger unit downwardly and places the blade 6 below the level of the ground to the depth to which it is desired to remove rock from the soil 9. The rock extractor is attached to, for example, a tractor. As the tractor moves forward, the blade 6 engages the ground and peels or lifts off (much the way one would peel an orange) a layer of soil and rock 9, the thickness of which is about the same as the depth of the blade 6 in the ground. The layer of soil and rock 9 is lifted upwardly and over the blade 6 and piles up on the surface of the blade and the front portion of the grate 2. As the rock extractor moves forward, the pile of rock and soil 9 reaches a height of 1 to 3 times the thickness of the depth of the blade 6 below the surface of the ground.

There is disposed immediately behind the digger blade 6 the grating of grate unit 2 which contains therein the plurality of parallel flat bars 23 for separating the rock 14 from the soil, retaining the rock 14 on the grate, sifting the soil 18 free of rock through the grate and returning the soil 18 to the ground. The rock free soil 18 is returned to the ground and forms a relatively level layer, ready for planting, over the untreated portion of the ground 19 which still contains therein rock 14. There is disposed immediately above and parallel to the grate unit 2 the conveyor unit 3. The operation of the drive gears 75 of the conveyor unit 3 and movement of the endless chain 74 causes the paddles 83 to move around the drive gear 75 and the front idlers 69. The attachment of the conveyor unit 3 to the grate unit 2 by the four parallel lever arms 41 and 42, respectively, causes the conveyor 3 to be forcefully driven downwardly and forwardly into the pile of rock and soil 9 being worked to rapidly remove the rock and soil 9 rearwardly onto and over the grating of grate unit 2. As the rock and soil are moved rearwardly along the grate, the soil 18 is forced and sifted through the grating and the rocks 14 separate from the soil 18. The separated rocks 14 are continually moved rearwardly by action of the conveyor paddles 83 to a collection apron 4 connected to the back end of the grate unit 2. The rocks drop from the collection apron 4 onto a conventional conveyor unit 101 which lift the rocks 14 to a level to be loaded into a hopper unit 102 and/or truck for removal from the area (FIG. 5).

The conveyor drive gears 75 are normally driven by a hydraulic powered take-off from the draft machine or equipment. However, other drive means can be provided. For reason of the foregoing construction, it will be seen that the mounting of the conveyor unit 3 on the grate unit 2 by the parallel lever arms 41 and 42 construction permits the forceful, forward and downward movement of the entire conveyor unit 3 on the pile of rock and soil 9 being worked at the forward end of the conveyor unit 3. This construction, however, still allows, if an unmovable object, for example a large rock, is contacted by the paddles 83 of the conveyor unit 3 to move upwardly so as to allow the rock to be cleared and moved rearward and avoid possible damage to the conveyor 3 and/or paddles 83. It will be seen that because of the forward and downward movement of the conveyor 3, due to the operation of the conveyor, that the conveyor is constantly urged with increasing force to dig deeper into the pile of soil and rock 9 and take larger bites of the pile of rock and soil and to move the rock and soil rearwardly on the grating. Since these larger bites enable the soil and rock to be moved rearwardly, faster and more effectively, the dirt pile is kept to a minimum size such that the forward motion of the extractor apparatus 1 through the ground can be increased. Additionally, because of the aforementioned greater bites, the soil is moved back onto the grating faster and more effectively such that large volumes of rock and soil can be processed and the soil effectively separated from the rock, sifted and returned to the ground.

The upward movement of the entire conveyor unit 3 to accommodate the size of the pile of rock and soil is provided for by the parallel lever arms 41 and 42 linkage of the conveyor unit 3 to the grate unit 2 and is such that the parallel relationship of the conveyor unit and grate unit is maintained and the entire weight of the conveyor unit remains in contact with and is brought to bear on the pile of rock and soil 9 being worked. Not only is the full weight of the conveyor 3 brought to bear on the pile of soil and rock 9 being worked but, as mentioned above, the action of the paddles 83 of the conveyor unit 3 on the pile of rock and soil 9 provides additional forces to be brought to bear on the soil and rock being worked. The overall action of the conveyor is to attempt to have the conveyor unit pass under the pivot pins 43 and 44 connecting the forward end of the parallel lever arms 41 and 42, respectively, such that a maximum force far exceeding the force of the mere weight of the conveyor unit is brought to bear on the pile of soil and rock being worked.

From the above description, it will be readily understood that the described rock extractor will clear a field of rock to a desired depth suitable for farming and cultivation and return the soil in a loose aerated, substantially level form ready for planting.

APPARATUS VARIABLES

The digger blade can be made from two-inch thick steel and can be 14 inches in width and 9 feet in length. The forward cutting edge of the digger blade can be made separately and bolted to the digger blade in a manner such that the cutting edge, e.g. the first 4 inches of the digger blade, when damaged, can be removed and replaced (not shown).

The vertical beam member 5 and cross beam member 7 can similarly be made from two-inch steel stock. The parallel flat bars 23 of the grate unit 2 can be spaced 2 to 6 inches apart, preferably 2 to 4 inches, for example 3 inches apart, and determine the size of the rock that will be retained by the grating. The parallel bars 23 can be made from 1 by 4 inch steel and can be 9½ feet in length. The width of the grating can be 7 feet.

The conveyor unit overall length can be 9½ feet and can have a width of 7 feet. The drive gears and idler gears can be 18 inches in diameter. The paddles connecting the two endless chains of the conveyor unit can be made from 1 by 4 inch steel and be 7 feet in length. The spacing between the paddles is an important feature of the conveyor and can be 1 to 4 feet, 2 to 3 feet and preferably 2 feet apart.

In the operation of the rock extractor apparatus, the depth of the digger blade 6 below the ground level is a critical feature and is determined in part by the soil condition and the depth to which it is desired to clear rock for farming. The depth of the digger blade below the ground level can be 4 to 12 inches, preferably 6 to 10 inches, and more preferably about 6 to 8 inches below the surface of the ground. The angle of the grate unit and of the conveyor which is parallel thereto to the ground surface may be 20° to 60°, preferably 30° to 45° and more preferably about 30° to 40°. The angle of the blade relative to ground level can be 10° to 60°, preferably 15° to 45° and more preferably 20° to 40°. The included angle of the parallel lever arms to the longitudinal axis of the conveyor unit is a critical feature of the present invention and can be 20° to 60°, preferably 30° to 50° and more preferably 40° to 45°. The angle of the parallel lever arms in part determine the force which is applied to the pile of rock and soil being worked.

The distance of the point at which the front idler wheel contacts the grate unit to the leading edge of the digger blade is also an operating variable of the invention and may be 1 to 4 feet, preferably 2 to 3 feet and more preferably about 2½ feet.

The force applied by operation of the conveyor is in part determined by the feet per minute (FPM) at which the conveyor is operated which may be 150, preferably 200 and more preferably 225 (rated at 2500 psi relief valve setting). The speed of the rock extractor apparatus over the ground is also an important feature of the invention and can be 1 to 5 miles an hour, preferably 2 to 3 miles an hour or more preferably about 3 miles an hour.

The ground speed of the rock extractor, the angle of the digger blade relative to ground level, the FPM at which the conveyor is operated and the depth of the digger blade below ground level determines the height of the soil and rock pile above the grate level and this height can be 1 to 3 times the depth of the digger blade below ground level. All these items coact, i.e. interact for the efficient operation of the rock extractor apparatus. The rock extractor when operating efficiently will process 10 to 50 cubic yards per minute of rock and soil, preferably 15 to 40, and more preferably 15 to 20 cubic yards per minute of soil and rock.

The condition of the ground is also a factor in operating the rock extractor. Generally dry level ground is more easily worked than damp or wet ground. The size of the rocks to be removed and the depth of the rocks below the ground level and the population of rocks in the ground determine the rate at which the rock extractor can extract and separate rocks from the soil. Also, as mentioned above, the spacing between the parallel bars of the grating of the grate unit will determine the size of the rocks that are retained on the grating and the size that will pass through with the soil being sifted through the grating. A suitable draft unit for the rock extractor apparatus described above can be a D-9 type Caterpillar tractor.

In another embodiment of the invention, the conveyor unit and grate unit of the present invention can be adapted to be used in earth moving equipment such as that described in Johnson U.S. Pat. No. 2,984,022, the disclosure of which is incorporated herein by reference in its entirety. The earth moving equipment embodiment of the present invention comprises a container having a front end and a back end and parallel side walls and a floor connecting the parallel side walls, front end back ends, and the container has front and back wheel means connected to the front and back ends of the container for moving the container over the ground. The conveyor unit alone or the conveyor unit and the grate unit of the present invention can be substituted for the conveyor unit described in the Johnson patent and mounted in the container of the earth moving equipment described in the Johnson patent.

In an embodiment in which the conveyor unit alone is used the parallel lever arms can be adjustably pivotally mounted directly to the inner side walls of the container. The manner in which the conveyor is mounted is such that when in operation not only is the full weight of the conveyor brought to bear against the soil and/or rock being worked but also by action of the parallel lever arms the conveyor is forcefully driven downwardly and forwardly into the soil or dirt and/or rock being worked. The operation of the conveyor is similar to that when used with the rock extractor apparatus with the exception that the forward portions of the lever arms are pivotally connected to the inner side walls of the container, instead of to the upper portions of beam members (35, 36). Because of the forceful action of the conveyor downwardly and forwardly into the soil and rock being worked, the soil and rock are moved rapidly rearwardly into the container to fill the container. Stops for limiting the downward movement of the conveyor and preventing the conveyor from damaging the scrapper blade can be positioned on the inner side walls of the container in the same positions relative to the parallel lever arms as shown in the rock extractor apparatus. In this embodiment where only the conveyor unit is mounted in the container, it is mounted in approximately the same relative position to the scrapper blade as shown in the Johnson patent.

In another embodiment of the invention, the conveyor unit and grate unit can be mounted together in the container, see, for example, FIG. 6 of the drawings. This may be done by providing suitable means for adjustably bolting or otherwise connecting the side frame members of the grate unit to the inner side walls of the container. This manner of installation allows considerable ease of installing and removing the conveyor and grate unit and flexibility in the operation and use of the earth moving equipment.

In a variation of this embodiment, the flat parallel bars which form the grate can be omitted from the grate unit and the conveyor can, in the manner discussed immediately above, be used to rapidly fill the container with soil.

In another variation of this embodiment, the flat parallel bars forming the grate unit can be installed and the conveyor unit and grate unit can be used to separate soil from rock merely by providing a generally vertically disposed transverse baffle at a point about midway between the front and rear portions of the container. The transverse baffle divides the container into two bens, each of which cooperates with one of the doors in the floor of the container. The transverse baffle can be about one-half the height up to the full height of the side walls of the container. The two doors in the floor of the container in this embodiment would be individually controlled so that the soil and rock after being picked up and moved can then be separately dumped.

A particular use of this embodiment of the invention can be to pick up loose rocks and soil from the ground, separate the soil from the rocks, directly return the soil to the ground and collect the rocks in the rear portion of the container. In this embodiment, the forward door in the floor of the container is removed or left open. The collected rocks can then separately be dumped at a desired location The use and operation of the conveyor unit relative to the scraper blade, and the operation of the conveyor unit and the grate unit relative to the scraper blade are, otherwise then discussed above, the same as previously described with reference to the rock apparatus extractor unit.

Since the earth type moving equipment described in the Johnson patent is used primarily for picking up and moving loose dirt and rocks, the conveyor unit and/or grate unit mounted in the container of the earth moving equipment can be made from lighter weight construction materials than those described with respect to the rock extractor apparatus.

The rock extractor unit of the present invention can be used to dig up and remove rocks to clear land for farming and cultivation, clear land for building of roads, and clear land for building of homes. The grate unit and conveyor unit can be mounted on conventional earth moving equipment and used to pick up and move dirt and/or rocks and, if desired, to separate the dirt and rocks while they are being picked up and moved.

The foregoing specific embodiment of the invention have been shown and described only for the purpose of illustrating the principles of the invention and applicant intends to cover the various modifications and applications containing and/or using the principles of the invention that will occur to those skilled in the art.

I claim:

1. An apparatus for picking up dirt comprising blade means for picking up the dirt, conveyor means for rapidly moving the dirt rearwardly away from said blade means and support means for carrying said blade means and conveyor means; said conveyor means being disposed above and behind the leading edge of said blade means and extending upwardly and rearwardly from said blade means; said conveyor means including main frame members joined together by connecting means, said main frame members having rotatably mounted thereon at one end a pair of drive gears and at the other end a pair of idler wheels around which there are carried endless chains having disposed between them a plurality of evenly spaced paddles, means connecting said drive gears to a motor for driving said drive gears, said main frame members having a front and back pair of parallel lever arms pivotally connected at their back ends to said main frame members and extending forwardly and upwardly from said main frame members, and pivotally connected at their front ends to said support means, whereby said conveyor means can move vertically upward or downward relative to a line drawn through the longitudinal axis of said conveyor means and relative to said blade means, while maintaining a parallel relationship with said drawn line; and stop means connected to said suport means and positioned relative to said conveyor means to limit the downward movement of said conveyor means.

2. The apparatus of claim 1 wherein said support means comprises side frame members joined together by connecting means, said side frame members having rigidly connected thereto a pair of front upstanding beam members and back upstanding beam members, the upper portion of the front upstanding beam members being pivotally connected to the front portion of said front pair of parallel lever arms, the upper portion of the back upstanding beam members being pivotally connected to the front portion of said back pair of parallel lever arms, and means for pivotally connecting the front portion of said side frame members relative to said blade means.

3. The apparatus of claim 2 wherein said side frame members are pivotally connected at their front ends to vary the inclination of the conveyor relative to a ground surface.

4. The apparatus of claim 2 wherein said support means includes a grate unit, said grate unit comprising a grating consisting of a plurality of evenly spaced, flat parallel bars positioned between said side frame members by front connecting means and back connecting means by which said grating is connected to said side frame members.

5. The apparatus of claim 4 wherein said blade means comprises a digger unit including a digger blade having two ends each of which is rigidly connected to a vertical beam member, said vertical beam member having a lower portion and an upper portion, and the front portion of said frame members being pivotally connected to the lower portions of said vertical beam members.

6. The apparatus of claim 2 wherein said side frame members are mounted in a container and said blade means comprises a scraper blade, wherein said scraper blade is carried by said container at the front end of said container and said side frame members are pivotally connected at the front ends thereof to the front end of said container.

7. A method for digging rock and dirt from the ground to remove the rock from the ground to a desired depth, separate the rock from the dirt and to return the dirt to the ground which comprises attaching the apparatus of claim 5 to a draft machine, engaging the digger blade the desired depth below the ground surface, moving the draft machine and apparatus forward, digging up a layer of dirt and rock, lifting the layer of dirt and rock upwardly over the digger blade, piling the dirt and rock on the digger blade and front portion of the grate unit, contacting the front portion of the conveyor unit with the pile of dirt and rock, operating the conveyor unit to rotate the paddles around the conveyor unit and have the paddles dig into the pile of dirt and rock, whereby the action of said paddles coact with the pile of dirt and rock and said parallel lever arms to forcefully drive the conveyor unit and paddles downwardly and forwardly into the pile of rock and dirt to move the rock and dirt rearwardly onto and over the grate unit, separating the dirt from the rock, said paddles pushing the dirt rearwardly and through the grate and returning the dirt to the ground, the separated rocks being continually moved rearwardly and upwardly on the grate by the conveyor paddles and discharging the rocks from the back end of the conveyor.

8. The method of claim 7 wherein the dirt is soil suitable for farming.

9. The method of claim 7 wherein dirt comprises land suitable for use as a building site.

10. A method for scraping dirt from the ground and transporting the dirt to a different location which comprises attaching the apparatus of claim 6 to a draft machine, engaging the scraper blade with the ground surface, moving the draft machine and apparatus forward, scraping up dirt, lifting the dirt upwardly over the scraper blade, piling the dirt on the scraper blade and front portion of the container, contacting the front portion of the conveyor unit with the pile of dirt, operating the conveyor unit to rotate the paddles around the conveyor unit and have the paddles dig into the pile of dirt, whereby the action of said paddles coact with the pile of dirt and said parallel lever arms to forcefully drive the conveyor unit and paddles downwardly and forwardly into the pile of dirt to move the dirt rearwardly and into the container, piling the dirt in the container and moving the container to another location and discharging the dirt.

11. The method of claim 10 wherein the dirt contains loose rocks.

12. The method of claim 10 wherein the dirt comprises land suitable for a building site.

13. An apparatus for separating rock from dirt comprising blade means for picking up the dirt and rock, conveyor means for rapidly moving the dirt and rock rearwardly away from said blade means and support means for carrying said blade means and conveyor means; said support means comprising side frame members joined together by front and back connecting means, said side frame members containing therebetween grate means consisting of a plurality of evenly spaced, flat parallel bars positioned between said side frame members, and said front connecting means and said back connecting means connecting said grate means to said side frame members; said side frame members having rigidly connected thereto a pair of front upstanding beam members and back upstanding beam members; said conveyor means being disposed proximate to, above and behind the leading edge of said blade means and extending upwardly and rearwardly from said blade means; said conveyor means including main frame members joined together by connecting means, said main frame members having rotatably mounted thereon at one end a pair of drive gears and at the other end a pair of idler wheels around which there are carried endless chains having disposed between them a plurality of evenly spaced paddles, means connecting said drive gears to means for driving said drive gears; said main frame members having a front pair of parallel lever arms and back pair of parallel lever arms pivotally connected at their back ends to said main frame members and extending forwardly and upwardly from said main frame members; the upper portion of the front upstanding beam members being pivotally connected to the front portion of said front pair of parallel lever arms, the upper portion of the back upstanding beam members being pivotally connected to the front portion of said back pair of parallel lever arms, whereby said conveyor means can move vertically upward or downward relative to said grate means, while maintaining a parallel relationship with said grate means; and stop means positioned relative to said conveyor means to limit the downward movement of said conveyor means.

14. The apparatus of claim 13 wherein said side frame members are pivotally connected at their front ends to vary the angle of inclination of the conveyor relative to said blade means and to a ground surface.

15. The apparatus of claim 13 wherein said blade means comprises a digger unit including a digger blade having two ends each of which is rigidly connected to a vertical beam member, said vertical beam member having a lower portion and an upper portion, and the front portion of said frame members being pivotally connected to the lower portions of said vertical beam members.

16. A method for digging rock and dirt from the ground to remove the rock from the ground to a desired depth, separate the rock from the dirt and to return the dirt to the ground which comprises attaching the apparatus of claim 13 to a draft machine, engaging the digger blade the desired depth below the ground surface, moving the draft machine and apparatus forward, digging up a layer of dirt and rock, lifting the layer of dirt and rock upwardly over the digger blade, piling the dirt and rock on the digger blade and front portion of the grate unit, contacting the front portion of the conveyor unit with the pile of dirt and rock, operating the conveyor unit to rotate the paddles around the conveyor unit and have the paddles dig into the pile of dirt and rock, whereby the action of said paddles coact with the pile of dirt and rock and said parallel lever arms to forcefully drive the conveyor unit and paddles downwardly and forwardly into the pile of rock and dirt to move the rock and dirt rearwardly onto and over the grate unit, separating the dirt from the rock, said paddles pushing the dirt rearwardly and through the grate and returning the dirt to the ground, the separated rocks being continually moved rearwardly and upwardly on the grate by the conveyor paddles and discharging the rocks from the back end of the conveyor.

17. The method of claim 16 wherein the digger blade is engaged at a depth of 6 to 10 inches below the ground surface.

18. The method of claim 16 wherein there is an included angle between the parallel lever arms and the conveyor unit of 30 to 50° C.

19. Earth moving equipment comprising a container having a front end and a back end and parallel side walls and a floor connecting the parallel side walls, front and back ends, said container having front and back wheel means connected to the front and back ends of said container for moving said container over the ground; said container having mounted therein and between said parallel side walls apparatus for picking up dirt comprising blade means for picking up the dirt, conveyor means for rapidly moving the dirt rearwardly away from said blade means; the parallel walls of said container comprising support means for carrying said blade means and conveyor means; said conveyor means being disposed approximate to, above and behind the leading edge of said blade means and extending upwardly and rearwardly from said blade means; said conveyor means including main frame members joined together by connecting means, said main frame members having rotatably mounted thereon at one end a pair of drive gears and at the other end a pair of idler wheels around which there are carried endless chains having disposed between them a plurality of evenly spaced paddles, means connecting said drive gears to means for driving said drive gears; said main frame members having a front pair of parallel lever arms and back pair of parallel lever arms pivotally connected at their back ends to said main frame members and extending forwardly and upwardly from said main frame members, and pivotally connected at their front ends to said support means, whereby said conveyor means can move vertically upwardly or downward relative to a line drawn through the longitudinal axis of said conveyor means and relative to said blade means, while maintaining a parallel relationship with said drawn line; and stop means positioned relative to said conveyor means to limit the downward movement of said conveyor means.

20. The earth moving equipment of claim 19 wherein said apparatus is mounted between the parallel walls of said container on support means which comprises side frame members joined together by connecting means, said side frame members having rigidly connected thereto a pair of front upstanding beam members and back upstanding beam members, the upper portion of the front upstanding beam members being pivotally connected to the front portion of said front pair of parallel lever arms, the upper portion of the back upstanding beam members being pivotally connected to the front portion of said back pair of parallel lever arms, and means for pivotally connecting the front portion of said side frame members in said container relative to said container and said blade means.

21. The apparatus of claim 20 wherein said side frame members are pivotally connected at their front ends to vary the inclination of the conveyor relative to said blade means and to a ground surface.

22. The apparatus of claim 20 wherein said support means includes therebetween a grate unit, said grate unit comprising a grating consisting of a plurality of evenly spaced, flat parallel bars positioned between said side frame members, and said front connecting means and said back connecting means connecting said grate means to said side frame members.

23. The apparatus of claim 22 wherein said blade means comprises a digger unit including a digger blade having two ends each of which is connected to the parallel walls of said container, and the front portion of said frame members being pivotally connected to the front portion of said container.

24. The apparatus of claim 19 wherein said side frame members are mounted in said container and said blade means comprises a scraper blade, wherein said scraper blade is carried by said container at the front end of said container and said side frame members are pivotally connected at the front ends thereof to the front end of said container.

25. A method of scraping dirt from the ground and transporting the dirt to a different location which comprises attaching the apparatus of claim 19 to a draft machine, engaging the scraper blade with the ground surface, moving the draft machine and apparatus forward, scraping up dirt, lifing the dirt upwardly over the scraper blade, piling the dirt on the scraper blade and front portion of the container, contacting the front portion of the conveyor unit with the pile of dirt, operating the conveyor unit to rotate the paddles around the conveyor unit and have the paddles dig into the pile of dirt, whereby the action of said paddles coact with the pile of dirt and said parallel lever arms to forcefully drive the conveyor unit and paddles downwardly and forwardly into the pile of dirt to move the dirt rearwardly and into the container, piling the dirt in the container and moving the container to another location and discharging the dirt.

26. The method of claim 25 wherein the dirt contains loose rocks.

27. The method of claim 25 wherein the digger blade is engaged at a position relative to the ground such that it scrapes dirt or dirt and rocks from the ground into the container.

28. The method of claim 25 wherein there is an included angle between the parallel lever arms and the conveyor unit of 20° to 60° C.

* * * * *